United States Patent
Krishnamurthy et al.

(10) Patent No.: US 10,521,674 B2
(45) Date of Patent: Dec. 31, 2019

(54) TRAILER DOOR MONITORING AND REPORTING

(71) Applicant: SYMBOL TECHNOLOGIES, LLC, Lincolnshire, IL (US)

(72) Inventors: Adithya H. Krishnamurthy, Hicksville, NY (US); Justin F. Barish, Kings Park, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 249 days.

(21) Appl. No.: 15/853,077

(22) Filed: Dec. 22, 2017

(65) Prior Publication Data

US 2019/0197318 A1 Jun. 27, 2019

(51) Int. Cl.
*G06K 9/00* (2006.01)
*G06T 7/00* (2017.01)
*G06K 9/78* (2006.01)
*G06T 7/60* (2017.01)
*G06Q 10/08* (2012.01)

(52) U.S. Cl.
CPC ..... *G06K 9/00771* (2013.01); *G06K 9/00201* (2013.01); *G06K 9/78* (2013.01); *G06T 7/0008* (2013.01); *G06T 7/60* (2013.01); *G06Q 10/08* (2013.01); *G06T 2207/10028* (2013.01); *G06T 2207/30108* (2013.01); *G06T 2207/30232* (2013.01)

(58) Field of Classification Search
CPC .. G06K 9/00771; G06K 9/78; G06K 9/00201; G06T 7/0008; G06T 7/60; G06T 2207/30108; G06T 2207/30232; G06T 2207/10028; G06Q 10/08
USPC ........................................................ 382/103
See application file for complete search history.

(56) References Cited

U.S. PATENT DOCUMENTS

| 2009/0015400 | A1* | 1/2009 | Breed ................ | B60C 11/24 340/539.22 |
| 2013/0342653 | A1* | 12/2013 | McCloskey ........ | G01S 17/026 348/46 |
| 2014/0372183 | A1* | 12/2014 | Groble ............... | G06Q 50/28 705/7.38 |
| 2016/0297361 | A1* | 10/2016 | Drazan ............... | H04N 7/181 |
| 2017/0101278 | A1* | 4/2017 | Stone ................. | B65G 69/00 |
| 2017/0278061 | A1* | 9/2017 | Skaaksrud .......... | H04W 76/15 |
| 2017/0349166 | A1* | 12/2017 | Anderson ........... | B60W 30/02 |

* cited by examiner

*Primary Examiner* — Van D Huynh
(74) *Attorney, Agent, or Firm* — Yuri Astvatsaturov

(57) ABSTRACT

Embodiments of the present invention generally relate to trailer loading analytics. In an embodiment, the present invention is a method for detecting a trailer door status. The method includes: capturing a 3D image representative of a 3D formation; analyzing respective depth values of a first sub-plurality of the plurality of points of the 3D image to determine whether the formation is within a first predetermined distance threshold from a location; and when the formation is within the first predetermined distance threshold, analyzing respective depth values of a second sub-plurality of the plurality of points to determine whether the 3D formation is substantially flat, a determination of the three-dimensional formation being substantially flat being indicative of the trailer door being closed.

26 Claims, 9 Drawing Sheets

TRAILER DOOR MONITORING AND REPORTING

BACKGROUND

In commercial trailer loading, once a trailer door is opened, the trailer 'load' is considered open, and when the door is closed, the trailer 'load' is considered closed. These 'load open' and 'load closed' values are often used to demarcate one trailer loading sequence from another. Typical methods for recording these values rely on either manual entry or customer data feed integration. These methods, however, can be problematic for at least the reasons that they can be inefficient, costly, error prone, and untimely.

Accordingly, there exists a need for improved, automated means of detecting and reporting a trailer door status for use in settings such as, for example, loading docks. Additionally, there is a need to optimize such means to perform efficiently.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
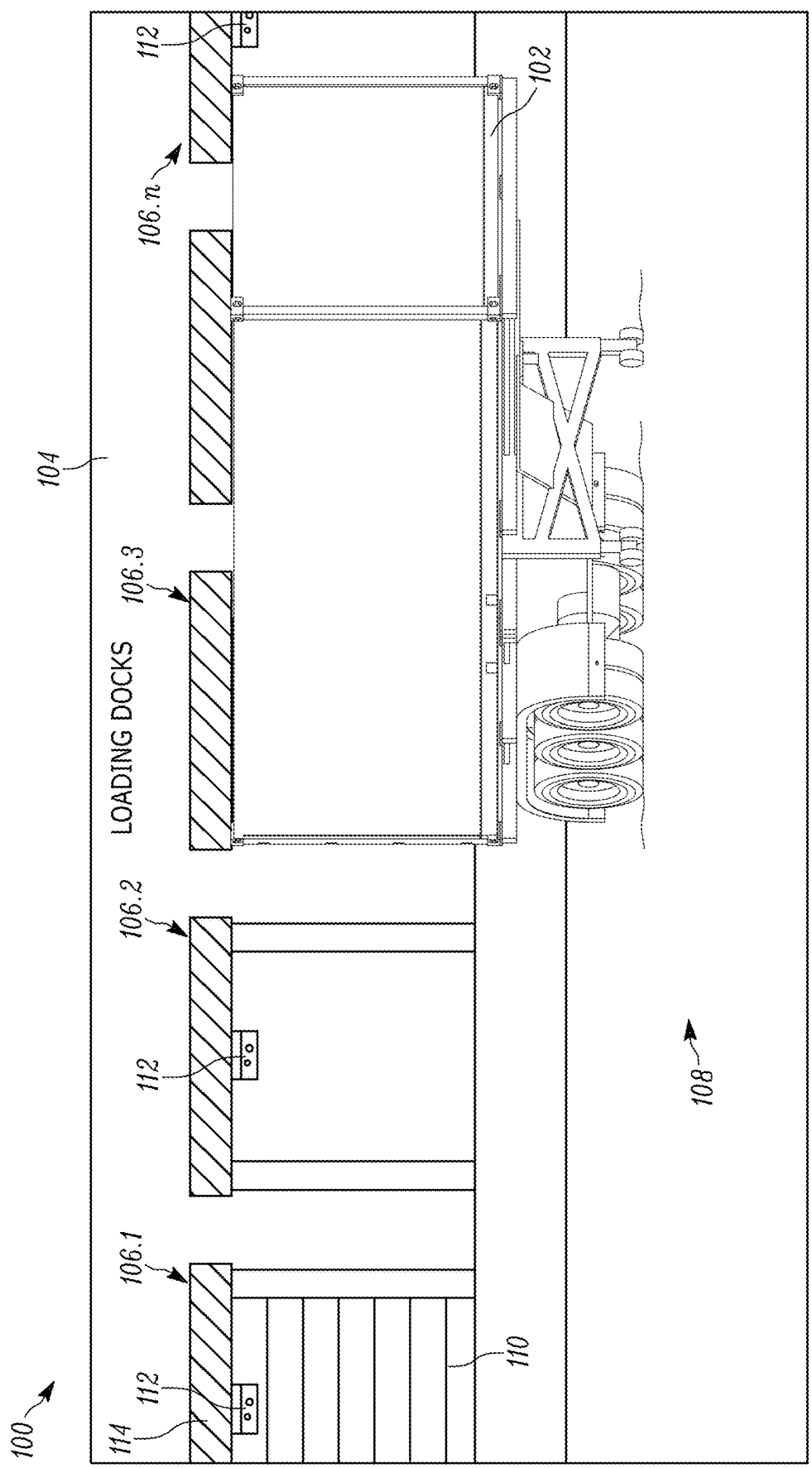
FIG. 1 illustrates a loading facility in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As used herein, the term "trailer" shall refer to any container transportable by at least one of a vehicle, a train, a marine vessel, and airplane, and configured to store transportable goods such as boxed and/or unboxed items and/or other types of freight. Accordingly, example of a trailer includes an enclosed container fixedly attached to a platform with wheels and a hitch for towing by a powered vehicle. An example of a trailer also includes an enclosed container removably attached to a platform with wheels and a hitch for towing by a powered vehicle. An example of a trailer also includes an enclosure that is fixedly attached to a frame of a powered vehicle, such as the case may be with a delivery truck, box truck, etc. As such, while the exemplary embodiment(s) described below may appear to reference one kind of a trailer, the scope of the invention shall extend to other kinds of trailers, as defined above.

In an embodiment, the present invention is a method for detecting a trailer door status. The method includes: mounting an image capture apparatus proximate a trailer-loading area, the image capture apparatus operable to capture three-dimensional images; capturing, via the image capture apparatus, a three-dimensional image representative of a three-dimensional formation, the three-dimensional image having a plurality of points with three-dimensional point data; analyzing respective depth values of a first sub-plurality of the plurality of points to determine whether the three-dimensional formation is within a first predetermined distance threshold from a location (e.g., at least one of an image capture apparatus location and a trailer-loading area location); and when the three-dimensional formation is within the first predetermined distance threshold, analyzing respective depth values of a second sub-plurality of the plurality of points to determine whether the three-dimensional formation is substantially flat, a determination of the three-dimensional formation being substantially flat being indicative of the trailer door being closed.

In another embodiment, the present invention is a trailer monitoring unit (TMU) for reporting a status of a trailer door. The TMU includes: a housing; an imaging assembly at least partially within the housing and operable to capture a three-dimensional image representative of a three-dimensional formation, the three-dimensional image having a plurality of points with three-dimensional point data; and a controller communicatively connected to the imaging assembly. The controller is operable to: analyze respective depth values of a first sub-plurality of the plurality of points to determine whether the three-dimensional formation is within a first predetermined distance threshold from a location (e.g., a TMU location); when the three-dimensional formation is within the first predetermined distance threshold, analyze respective depth values of a second sub-plurality of the plurality of points to determine whether the three-dimensional formation is substantially flat; and provide a determination of the trailer door being closed when the three-dimensional formation is substantially flat.

In still another embodiment, the present invention is a system for reporting a status of a trailer door at a loading dock. The system includes: a host computer; and a TMU mounted proximate a loading bay and communicatively connected with the host computer. The TMU includes: a housing; an imaging assembly at least partially within the housing and operable to capture a three-dimensional image representative of a three-dimensional formation, the three-dimensional image having a plurality of points with three-dimensional point data; and a controller communicatively connected to the imaging assembly and the host computer. The controller is operable to: analyze respective depth values of a first sub-plurality of the plurality of points to determine whether the three-dimensional formation is within a first predetermined distance threshold from a location (e.g., a TMU location); when the three-dimensional formation is within the first predetermined distance threshold, analyze respective depth values of a second sub-plurality of the plurality of points to determine whether the three-dimensional formation is substantially flat; and provide a first communication to the host computer representative of the trailer door being closed when the three-dimensional formation is substantially flat.

Referring now to the drawings, FIG. 1 illustrates an exemplary environment where embodiments of the present invention may be implemented. In the present example, the environment is provided in a form of a loading dock 100 (also referred to as a loading facility) where trailers 102 are loaded with various goods and/or where various goods are unloaded from the trailers 102. The loading dock 100 is comprised of a facility 104 having a plurality of loading bays 106.1-106.n facing a loading facility lot 108 where vehicles, such as semis (not shown), deliver and pick up trailers 102. To be loaded, each trailer 102 is backed toward the facility 104 such that it is generally perpendicular with the wall having the loading bays 106, and in line with one of the loading bays (in this case 106.3). As illustrated, each loading bay 106 includes a bay door 110 that can be lowered to close the respective loading bay 106 or raised to open the respective loading bay allowing the interior of the facility 104 to be accessible therethrough. Additionally, each loading bay 106 is provided with a trailer monitoring unit (TMU) 112. The TMU is mounted near the trailer loading area, preferably in the upper section of the loading bay 106 outside the door 110 facing the loading facility lot 108 or an interior/rear of a trailer 102 if one is docked at the respective loading bay. To protect the TMU from inclement weather, it could be mounted under a bay awning 114. Once docked, goods can be loaded onto/unloaded from the trailer 102 with the TMU 112 maintaining a view of the rear/inside of the trailer.

Figure 2:
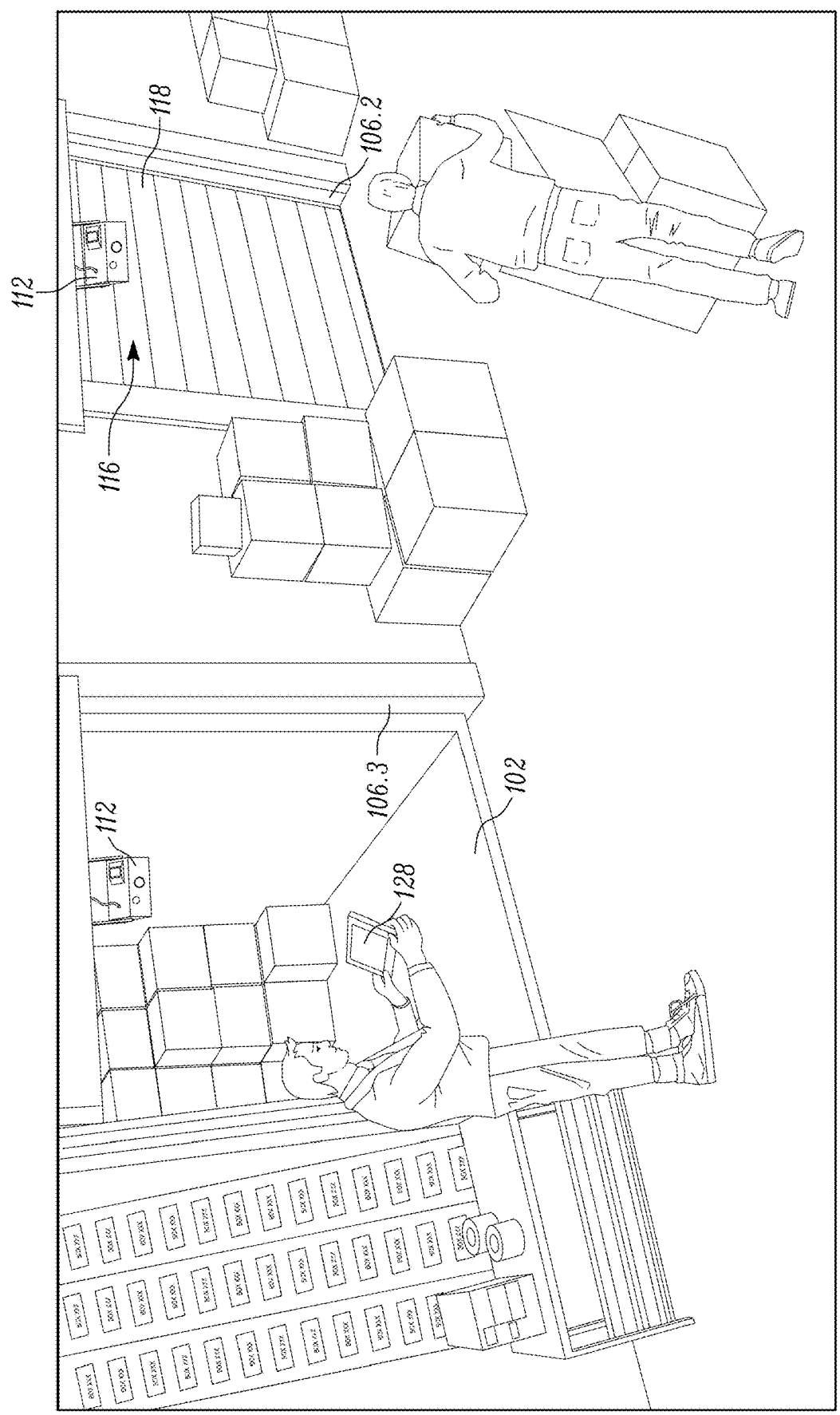
FIG. 2 illustrates an interior of the loading facility of FIG. 1.

FIG. 2 is an exemplary perspective view of the loading facility 104 of FIG. 1, as seen from the inside, depicting trailer 102 docked at a loading bay 106.3 with an open trailer door and trailer 116 docked at a loading bay 163.2 with a closed trailer 118. To help determine the status of the trailer door, the TMU 112 is employed, as described further below.

Figure 3:
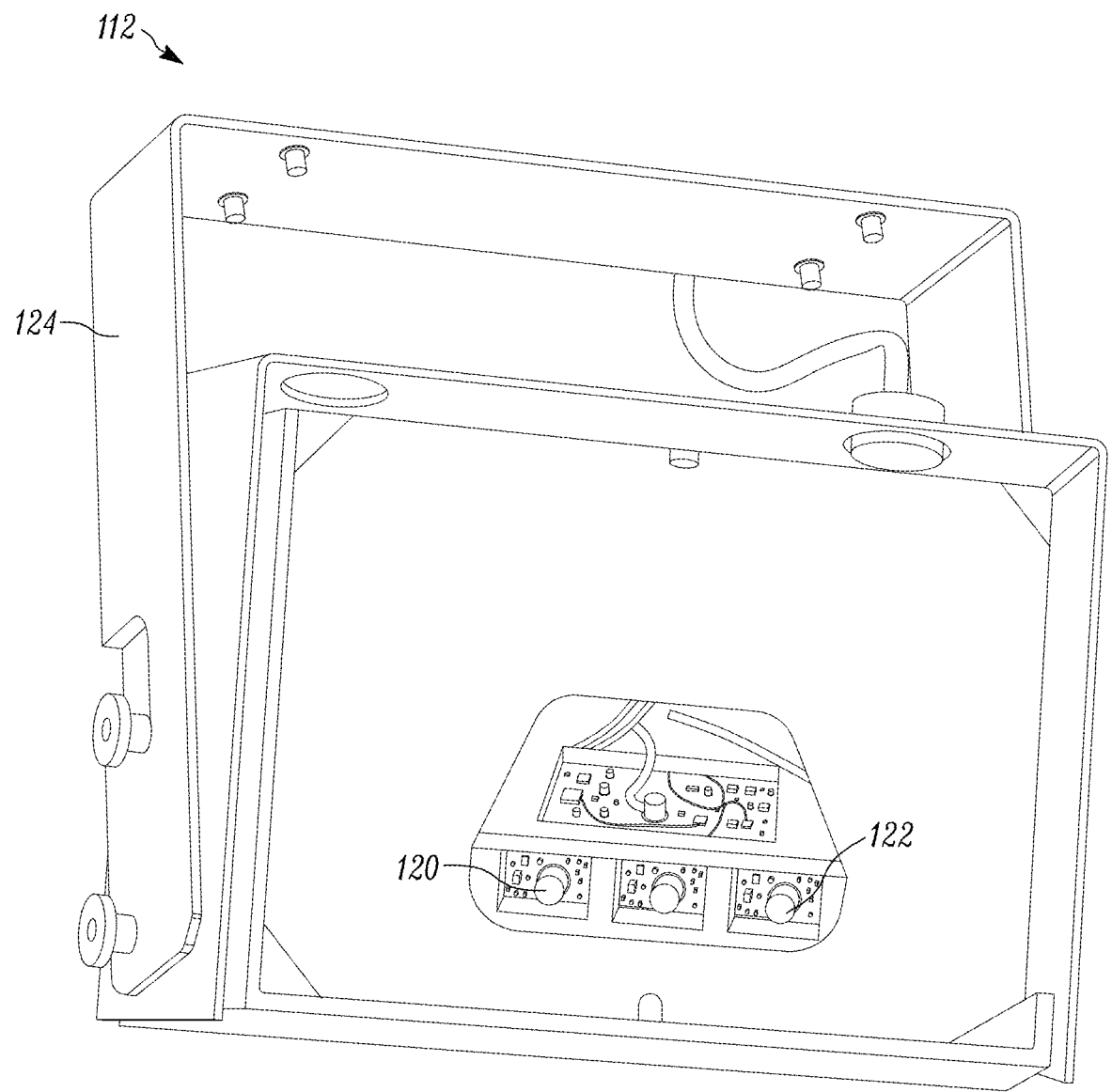
FIG. 3 illustrates a trailer monitoring unit in accordance with an embodiment of the present invention.

In the currently described embodiment and as shown in FIG. 3, the TMU 112 is a mountable device that includes a 3D-depth camera 120 for capturing 3D (three dimensional) images (e.g., 3D image data comprised of a plurality of points with three-dimensional point data) and a 2D camera 122 for capturing 2D images (e.g., 2D image data). The 2D camera may be an RGB (red, green, blue) camera for capturing 2D images. The TMU 112 also includes one or more processors and one or more computer memories for storing image data, and/or for executing application/instructions that perform analytics or other functions as described herein. For example, the TMU 112 may include flash memory used for determining, storing, or otherwise processing the imaging data and/or post-scanning data. In addition, TMU 112 may further include a network interface to enable communication with other devices (such as server 130). The network interface of TMU 112 may include any suitable type of communication interface(s) (e.g., wired and/or wireless interfaces) configured to operate in accordance with any suitable protocol(s). In various embodiments, and as shown in FIGS. 1 and 2, the TMU 112 is mounted via a mounting bracket 124 and oriented in the direction of docked trailers to capture 3D and/or 2D image data of the interior and exterior thereof.

In an embodiment, to capture 3D image data, the 3D depth camera 120 includes an Infra-Red (IR) projector and a related IR camera. The IR projector projects a pattern of IR light or beams onto an object or surface, which may include surfaces of the trailer 102 (like the door, walls, floor, etc.), objects within the interior of the trailer (like boxes, packages, temporary shipping equipment, etc.), and/or surfaces of the loading facility lot 108 (like the surface of the loading facility lot on which the trailers are parked). The IR light or beams may be distributed on the object or surface in a pattern of dots or points by the IR projector, which may be sensed or scanned by the IR camera. A depth-detection application, such as a depth-detection application executing on the one or more processors or memories of TMU 112, can determine, based on the pattern of dots or points, various depth values, for example, depth values of the interior of the trailer 102. For example, a near-depth object (e.g., nearby boxes, packages, etc.) may be determined where the dots or points are dense, and distant-depth objects (e.g., far boxes, packages, etc.) may be determined where the points are more spread out. The various depth values may be used by the depth-detection application and/or TMU 112 to generate a depth map. The depth map may represent a 3D image of, or contain 3D image data of, the objects or surfaces that were sensed or scanned by the 3D-depth camera 120.

Additionally, in an embodiment, to capture 2D image data, the 2D camera 122 includes an RGB (red, green, blue) based camera for capturing 2D images having RGB-based pixel data. In some embodiments, the 2D camera 122 captures 2D images, and related 2D image data, at the same or similar point in time as the 3D-depth camera 120 such that the TMU 112 can have both sets of 3D image data and 2D image data available for a particular surface, object, or scene at the same or similar instance in time.

Figure 4A:
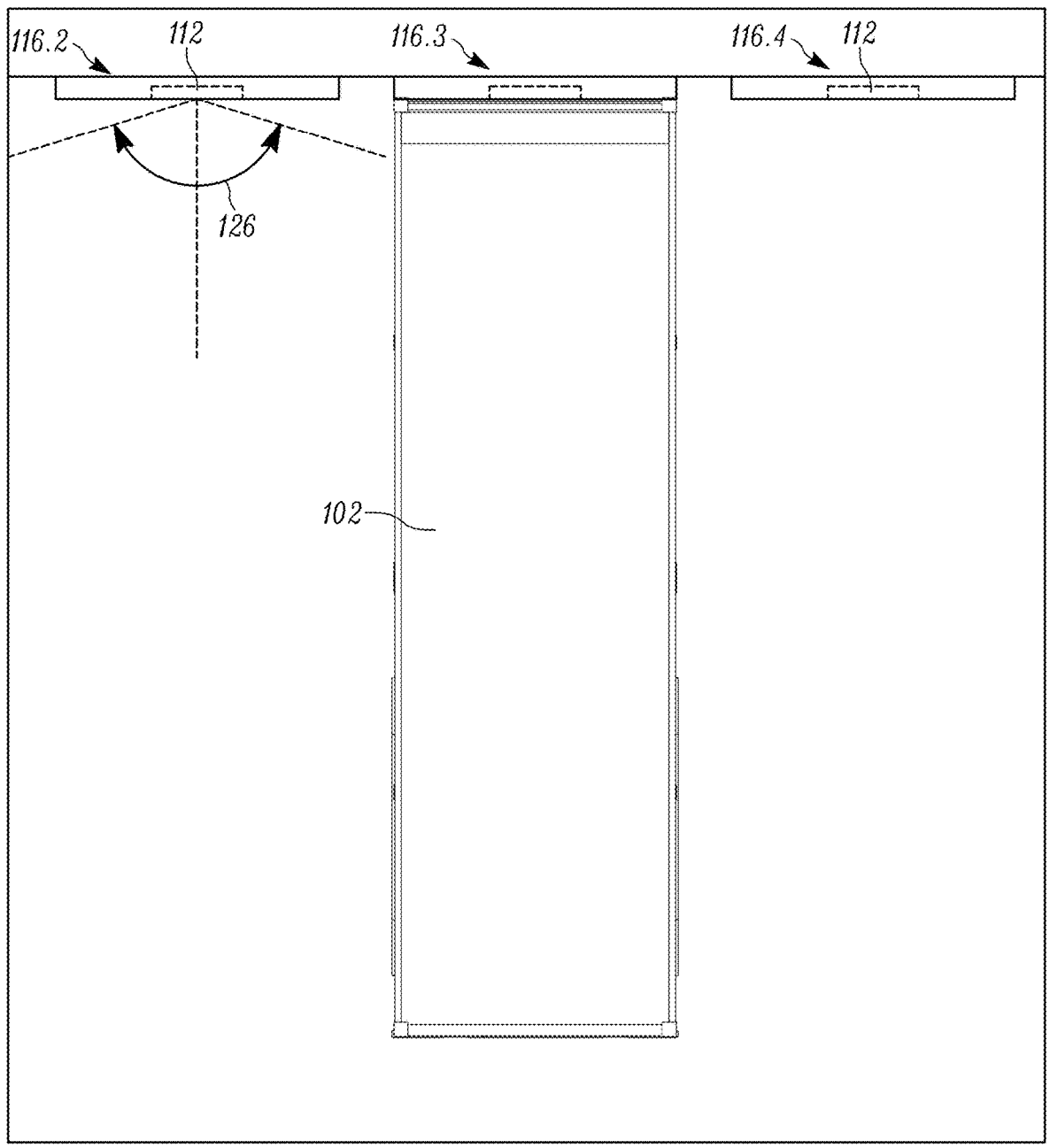
FIG. 4A illustrates a top-down view of the loading facility of FIG. 1 showing an exemplary field of view of a trailer monitoring unit.
Figure 4B:
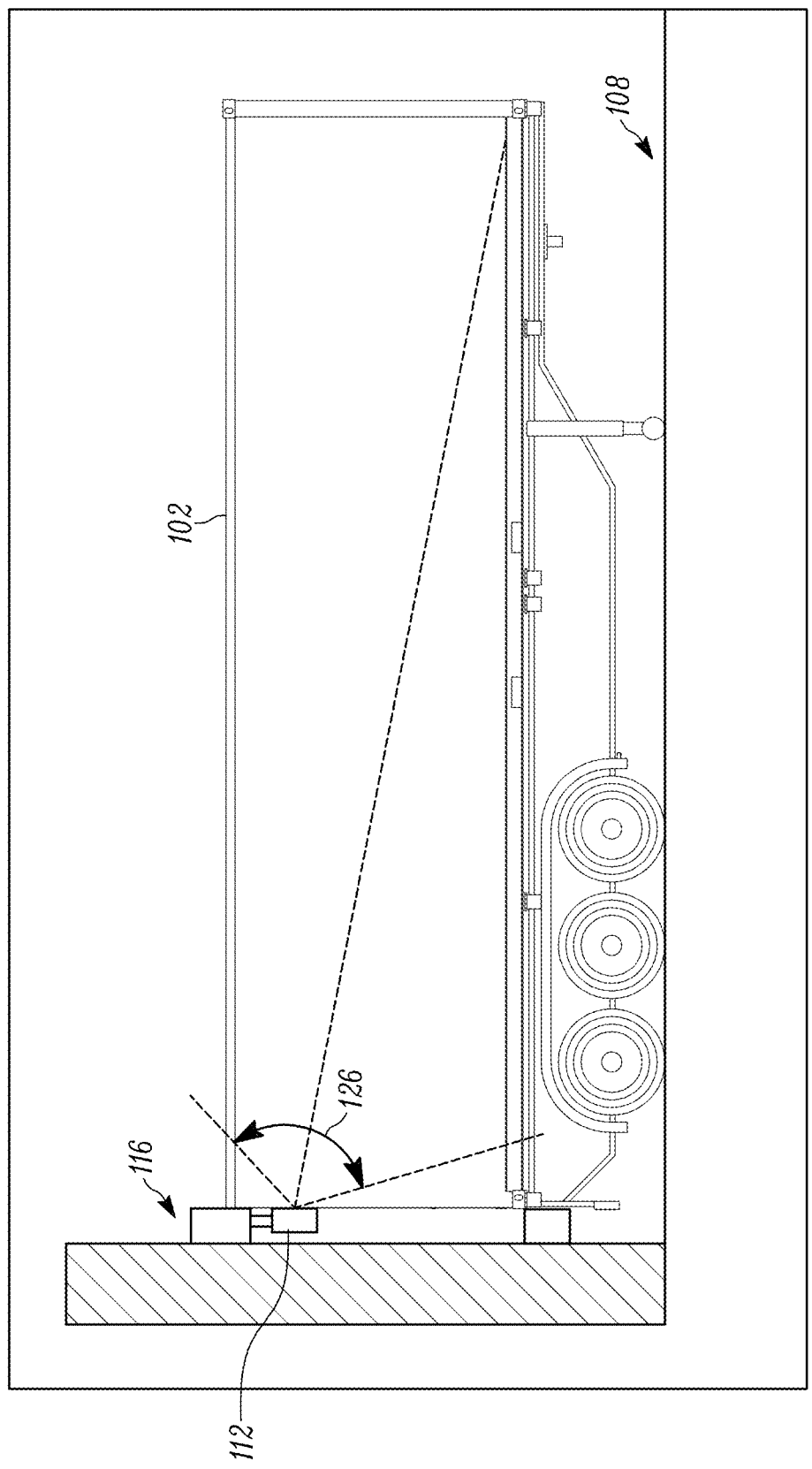
FIG. 4B illustrates a side view of the loading facility of FIG. 1 showing an exemplary field of view of a trailer monitoring unit.

Referring to FIGS. 4A and 4B, the TMU can be oriented such that its fields of view (FsOV) 126 for the 3D camera and the 2D camera expand to capture a majority of the interior of the trailer. Additionally, both FsOV can substantially overlap to capture data over substantially the same area. As a result, the TMU 112 can scan, sense, or otherwise capture image data from the walls, floor, ceiling, packages, or other objects or surfaces within the trailer to determine the 3D and 2D image data. Similarly, when a trailer is absent from the loading bay, the TMU can scan, sense, or otherwise capture image data from the loading facility lot 108 surface to determine the 3D and 2D image data. The image data may be processed by the one or more processors and/or memories of the TMU 112 (or, in some embodiments, one or more remote processors and/or memories of a server) to implement analysis, functions, such as graphical or imaging analytics, as described by the one or more various flowcharts, block diagrams, methods, functions, or various embodiments herein.

Figure 5:
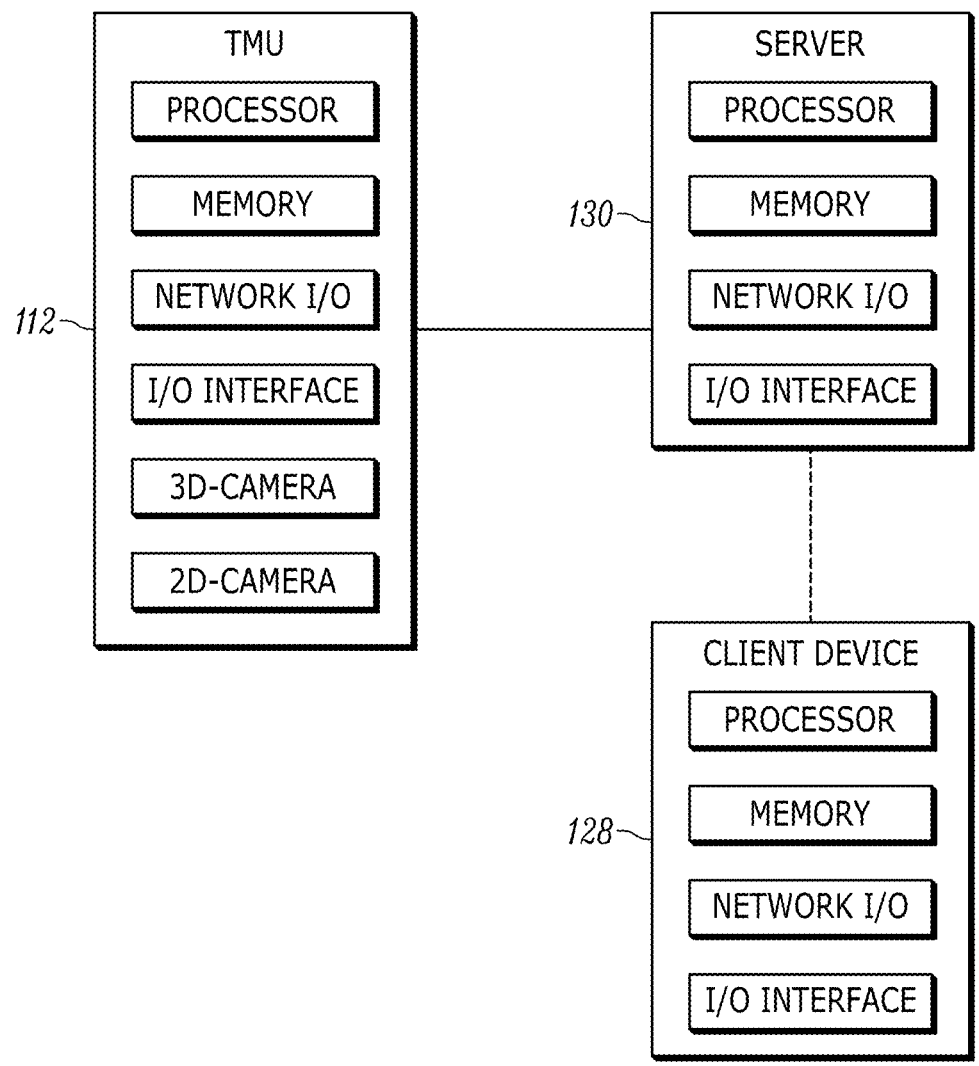
FIG. 5 illustrates an exemplary block diagram schematic of a communication network implemented in the facility of FIG. 1.

In some embodiments, the TMU 112 processes the 3D and 2D image data for use by other devices (e.g., client device 128 (which can be in a form of a mobile device, such as a tablet, smartphone, laptop, or other such mobile computing device), or server 130 (which can be in a form of a single or multiple computers operating to manage access to a centralized resource or service in a network)). The processing of the image data may generate post-scanning data that may include metadata, simplified data, normalized data, result data, status data, or alert data as determined from the original scanned or sensed image data. As shown in FIG. 5, which illustrates a block connection diagram between the TMU 112, server 130, and client device 128, these devices may be connected via any suitable communication means, including wired and/or wireless connectivity components that implement one or more communication protocol standards like, for example, TCP/IP, WiFi (802.11b), Bluetooth, Ethernet, or any other suitable communication protocols or standards.

In some embodiments, the server 130 may be located in the same loading facility 104. In other embodiments, server 130 may be located at a remote location, such as on a cloud-platform or other remote location. In still other embodiments, server 130 may be formed of a combination of local and cloud-based computers.

Server 130 is configured to execute computer instructions to perform operations associated with the systems and methods as described herein. The server 130 may implement enterprise service software that may include, for example, RESTful (representational state transfer) API services, message queuing service, and event services that may be provided by various platforms or specifications, such as the J2EE specification implemented by any one of the Oracle WebLogic Server platform, the JBoss platform, or the IBM Web Sphere platform, etc. Other technologies or platforms, such as Ruby on Rails, Microsoft .NET, or similar may also be used.

To assist with the loading and/or unloading of goods into the trailers, the aforementioned components may be used, alone or in combination, to detect and/or provide the status of a trailer door of a trailer docked at a loading bay.

Figure 6:
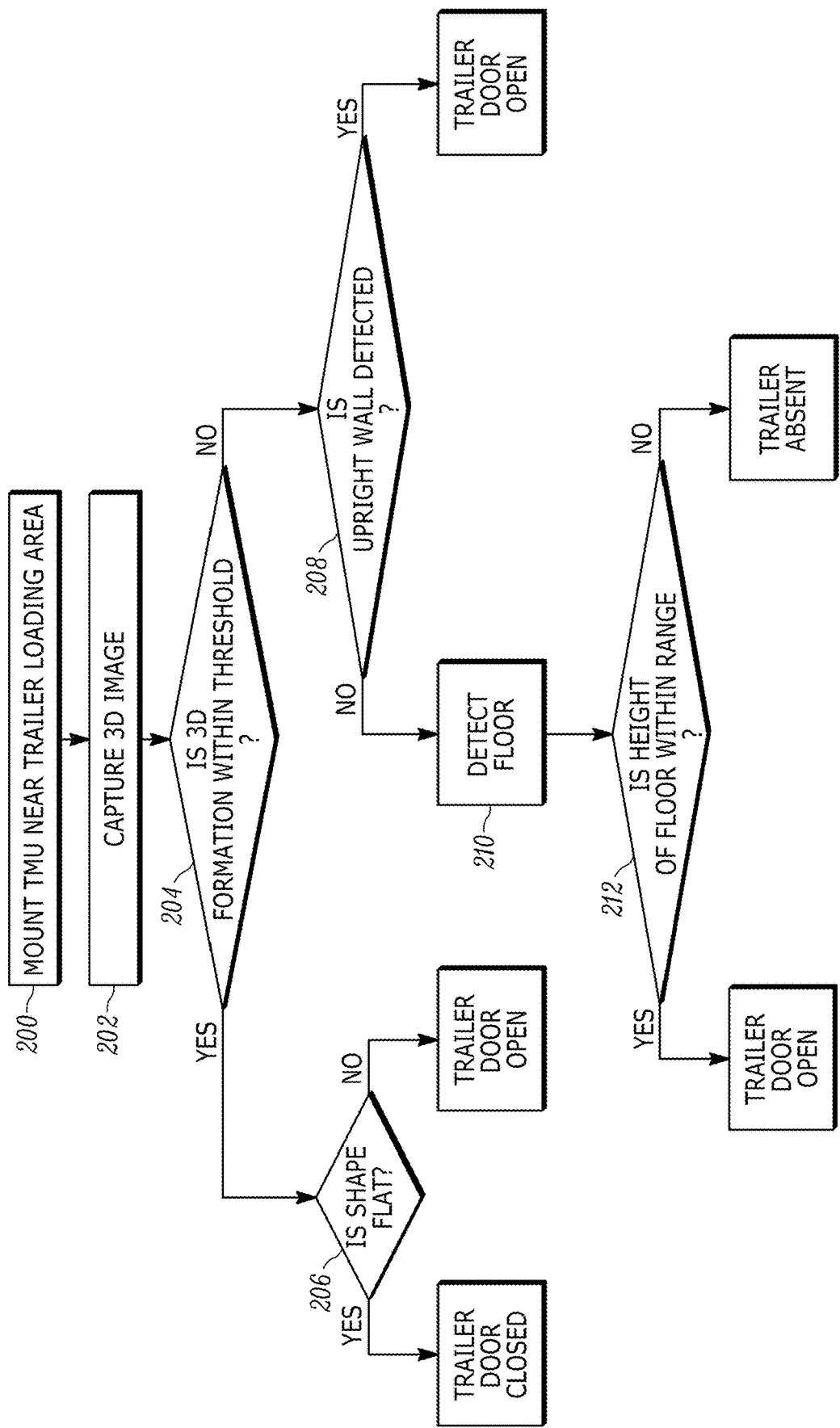
FIG. 6, illustrates a flowchart representative of a method of detecting a trailer door status in accordance with an embodiment of the present invention.

Referring to FIG. 6, shown therein is a flowchart representative of a method of detecting a trailer door status in accordance with an embodiment of the present invention. In step 200, the method includes mounting an image capture apparatus proximate a trailer-loading area, where the image capture apparatus is operable to capture three-dimensional images. The image capture apparatus can be implemented via the TMU 112 that is configured to capture 3D images. It is preferable to oriented the image capture apparatus such that its 3D FOV extend into the area of the loading facility lot, and more specifically, into the area where a trailer (such as trailer 102) is expected to be positioned during loading and unloading procedures. This configuration allows the image capture apparatus to sense (by capturing and analyzing 3D data) the presence or absence of various objects in the vicinity of its FOV, and make various determinations based thereon.

Next, in step 200, the method includes capturing, via the image capture apparatus, a three-dimensional image representative of a three-dimensional formation, the three-dimensional image having a plurality of points with three-dimensional point data. In an embodiment, the 3D camera of the image capture apparatus senses the depth of all the points within its FOV and assigns various depth values thereto, building, what can be referred to as, a point cloud representative of the environment within its FOV. Further to the depth measurements, the image capture apparatus can assign horizontal and vertical position data to each of the points, creating three-dimensional point data for each of the points captures. In some cases, the image capture apparatus may not be able to sense anything in at least some portions of its FOV. This can occur if, for example, some part of the environment is out of the depth detection range of the image capture apparatus, or if, in case of using an IR-based 3D camera, there is a problem with sensing IR reflections. In this case, three-dimensional point data associated with points that cannot be sensed can include data representative of a lack of an object or a non-presence of 3D data (which can be interpreted as an absence of a detectable object).

It has been recognized that when a trailer docks at a loading bay 106 and its door is closed, the presence of that door can be defined by a presence of a substantially flat surface that is a relatively short distance away from the loading bay. Given that the image capture apparatus is mounted within the general region of the loading bay, presence of a closed trailer door can also be defined by a presence of a substantially flat surface that is a relatively short distance away from a selected location like the location of the image capture apparatus itself. Accordingly, there needs to be a determination of a distance to the three-dimensional formation captured by the image capture apparatus and a shape analysis of that formation.

Referring back to FIG. 6, in step 204 the method includes analyzing respective depth values of a first sub-plurality of the plurality of points to determine whether the three-dimensional formation is within a first predetermined distance threshold from a location like the location of the image capture apparatus (e.g., the TMU) of the location of the trailer-loading area (e.g., the loading bay). As noted earlier, in some instances, not all points of the captured 3D image will have depth values associated therewith. This may be caused by, for example, objects being out of depth capture range, causing a depth value associated with some of the points to be unavailable. Additionally, the image capture apparatus may be configured to filter the captured 3D image to remove data associated with some of the points, such as, for example, the ceiling. For this reason, in analyzing the 3D image in step 204, it may be necessary to focus on a first sub-plurality of the points of the captured 3D image, omitting points which, for example, lack three-dimensional coordinates due to inability to capture data within range or due to application of filter(s).

Given that each point of a three-dimensional formation may not necessarily be the same distance away from the image capture apparatus, step 204 may rely on any number of approaches to select a distance for measurement. For example, the depth values of all points of the first sub-plurality of point can be averaged and the average depth can be used for the distance measurement. In other implementations, a histogram analysis of the depth values may be relied upon. In still other implementations, the distance may be represented by a minimum predetermined percentage of the largest depth values.

Since when docked, a trailer is expected to be abutting the loading bay or be within a near proximity thereto, for the three-dimensional formation to potentially be a trailer door, its distance needs to be within some predetermined distance threshold that is relatively close to the loading bay/image capture apparatus. In many implementations, that distance threshold is less than 3 feet. In those examples, it flows that if the distance to the three-dimensional formation is less than 3 feet, that formation could potentially be a trailer door.

If, in step 204, it is determined that the three-dimensional formation is within the predetermined distance threshold, the method includes, in step 206 analyzing respective depth values of a second sub-plurality of the plurality of points to determine whether the three-dimensional formation is substantially flat. Many, if not most, trailer doors are comprised of a substantially flat surface. While these doors often have locking and/or bracing mechanisms, these elements do not take away from an overall substantially flat appearance of a trailer door. Still, in many instances the potentially close positioning of the door to the TMU, the TMU's limited field of view, and the TMU's placement, will result in the TMU seeing only a top portion of the door which is likely to be substantially devoid of any locking and/or bracing elements. Accordingly, if it is determined that the three-dimensional formation has a substantially flat shape, that can serve as an indication of the trailer door being present and closed.

Though for the analysis of step 206 the second sub-plurality of the plurality of points may be the same as the first sub-plurality considered in step 204, that does not have to be the case. For example, it may be preferable to omit points that form discontinuous surfaces that have a calculated area that is smaller than some threshold. In other implementations, it may be preferable to analyze a continuous surface that has a minimum area. In still other implementations, it may be preferable to focus the analysis on a continuous surface around a predetermined point. This type of a selective analysis may help identify a substantially flat door even with the presence of locking, bracing, and/or other elements thereon.

The determination of a substantially flat shape itself can be performed via 3D imaging segmentation analysis. In some embodiments, sample consensus (SAC) segmentation analysis may be used to determine points in the 3D image data that correspond to different planes or surfaces. This can be applied to a wide variety of surfaces, including interior and exterior surfaces of the trailer (e.g., internal walls, floor, ceiling, and external surfaces like the exterior side of the door) and also surfaces of objects located within the trailer itself. SAC segmentation analysis determines, or segments, the different planes or surfaces of the environment into x, y, z coordinate planes by identifying a correlation of common points along x, y, z planes oriented within the 3D image data. As such, this method may be used to analyze a certain plurality of points within the 3D image and identify a presence of a plane corresponding to a substantially flat surface. Additionally, one may also determine whether a variance of the respective depth values of the second sub-plurality of the plurality of points is within a predetermined depth-variance threshold, the variance being within the predetermined depth-variance threshold being an indicator that the three-dimensional formation is substantially flat.

Contrary to an indication of a closed trailer door upon the identification of a substantially flat surface in step 206, the determination of the three-dimensional formation being not substantially flat is indicative of the trailer door being open. A non-substantially flat shape is a likely result of a plurality of items (e.g., boxes) that are stacked at various positions located at various distances away from the image capture apparatus. As a result, the surfaces of those boxes most likely will not be co-planar, preventing the appearance of a sustainably flat surface. While unlikely, to safeguard against an instance of evenly stacked boxes being interpreted as a substantially flat surface, an additional step may be provided where upon detecting a substantially flat surface, an indication of a closed trailer door is provided if the substantially flat surface is continuous. Thus, if there appears a substantially flat surface that includes gaps that are, for example, non-straight and are greater than 1 inch in width, such a surface would likely be the result of a number of well-stacked boxes, indicating an open trailer door. In other instances, it may be preferable to also examine the substantially flat surface to ensure that it is located within a predetermined cross-section of the FOV. Since trailers can be expected to pull right up to the loading bay, and thus the trailer door can be expected to appear within the entire FOV of the image capture apparatus or at least within a substantial portion thereof, the presence of the substantially flat surface can be compared to the expected position and coverage relative to the FOV.

Figure 7A:
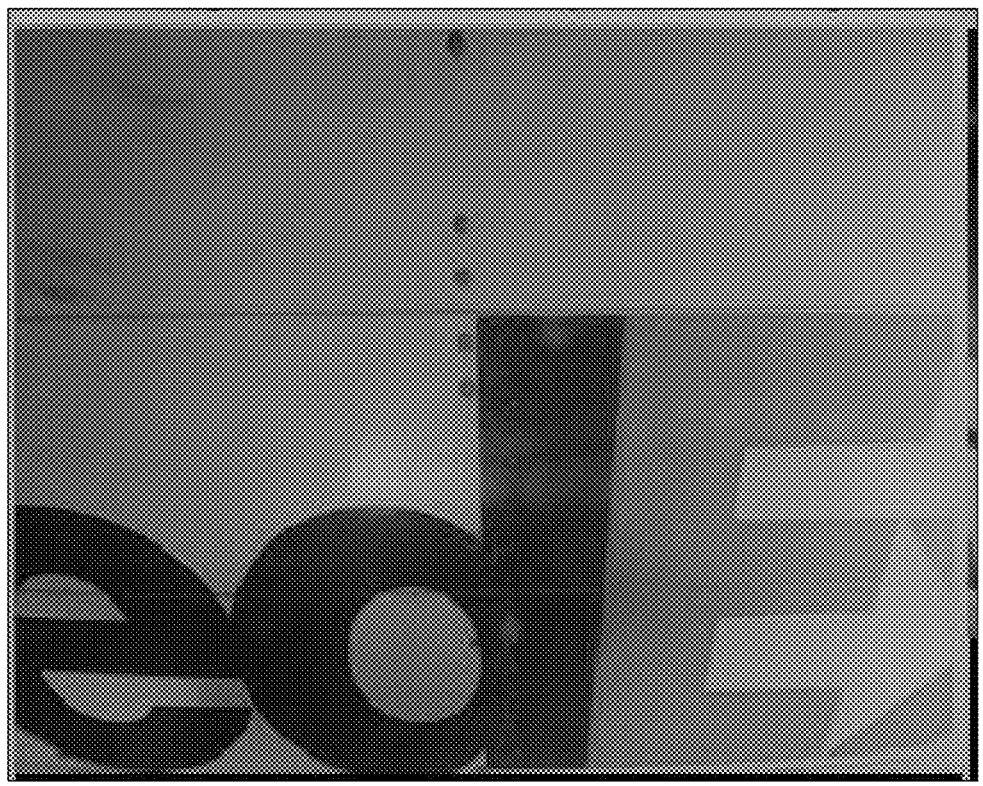
FIGS. 7A and 7B illustrate, respectively, exemplary 2D and 3D images of a docked trailer with a closed door.
Figure 7B:
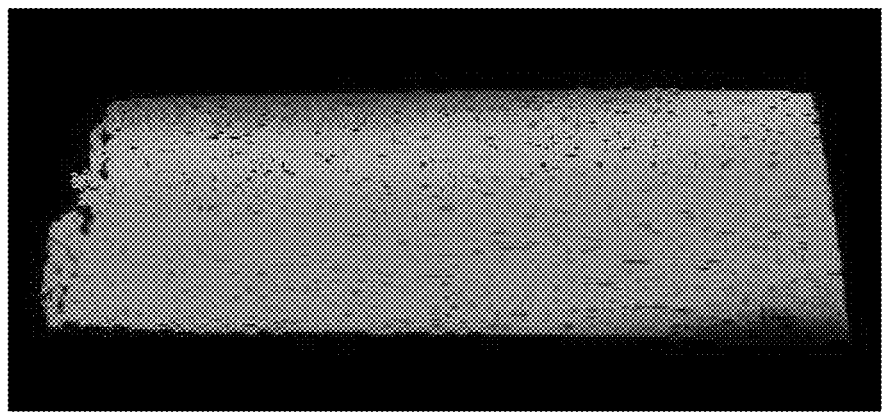
Figure 7C:
FIGS. 7C and 7D illustrate, respectively, exemplary 2D and 3D images of a docked trailer with an open door.
Figure 7D:

To help better understand step 206, FIGS. 7A-7D are provided to illustrate a visual example of a docked trailer with a closed door and a docked trailer with an open door. In particular, FIGS. 7A and 7B illustrate, respectively, 2D and 3D images of a trailer docked at a loading bay with its door closed. As can be seen in FIG. 7A, what appears within the entire FOV of the image capture apparatus is the trailer door that, despite having a small handle, a number of rivets, and seams between panels, appears as a substantially flat surface. This can be confirmed by evaluating the 3D image shown in FIG. 7B where a presence of a substantially flat (e.g., planar) surface can be ascertained. On the other hand, FIGS. 7C and 7D illustrate, respectively, 2D and 3D images of a trailer docked at a loading bay with its door open and a plurality of boxes stacked on top of each other. Although the average depth measurement to these boxes from the image capture apparatus can be below the threshold of step 204, their irregular placement virtually prevents a formation of a substantially flat surface like the door of FIG. 7A. This is confirmed by analyzing the 3D image of FIG. 7D where a series of surfaces of varying shapes and depth can be seen. The presence of such an irregular arrangement is an indication that what appears within the FOV of the image capture apparatus is a loading wall (i.e., a wall of goods) rather than a trailer door.

Returning to FIG. 6, if, in step 204, it is determined that the three-dimensional formation is outside the predetermined distance threshold, that may serve as an indication that a trailer with a closed door is not present at the loading bay. However, that still leaves the possibility that a trailer with an open door may be docked or that no trailer is present at all. This distinction may be important as, due to potential weather or environmental condition, a closing of a trailer door and a departure of a trailer may not accurately be detected in time. As a result, there may be instances where a docked trailer with an open door closes its door and departs the loading facility with the system maintaining its status as a trailer with an open door. This inaccurate reporting may delay loading/unloading procedures, causing potential operational issues. For that reason, it is advantageous to detect a difference between a presence of a trailer with an open door and an absence of a trailer all together, as such an absence can serve as an indicator that a door of a departed trailer has been closed.

To address this concern, it is first necessary to detect, by analyzing the three-dimensional image, a presence or an absence of an upright wall in step 208. If the presence of an upright wall is detected, this would be indicative of either a loading wall made up of a plurality of boxes that are within the trailer or the back wall of the trailer itself. Each of these situations results from the presence of a trailer with an open trailer door, and thus, a positive detection of an upright wall in step 208 can serve as an indication that the trailer is present and that its door is open. On the other hand, a non-detection of an upright wall (i.e., a detection of an absence of an upright wall) does not necessarily serve to immediately signal an absence of a trailer from a loading bay. This is because many image capture apparatuses operable to capture three-dimensional images have a limited range that is less than the depth of some of the trailers that are in use. For example, while the range of an image capture apparatus may be below 30 feet, many trailers used in transportation of goods are 53 ft., 63 ft., or 73 ft. As a result, a rear wall (opposite the door) of a docked trailer may not be within the detectable range of the image capture apparatus. Similarly, if at least some parts of the loading wall have not yet come within the detectable range, again, an upright wall will likely not be registered. Thus, it may be preferable to conduct additional analysis on the three-dimensional image.

This analysis is performed in steps 210 and 212. In step 210, the three-dimensional image is analyzed to detect a plane that corresponds to a substantially horizontally level surface. As with prior planar analyses, this may be achieved by, for example, SAC segmentation where an Ax+By+Cz=D equation can result defining the plane of the substantially horizontally level surface (also referred to herein as a "floor plane"). Thereafter, in step 212, the distance to the floor plane is evaluated along some direction. This direction can be defined by an x, y, z coordinate, where plugging these values into the aforementioned equation yields a D value. This D value can be associated with and/or represent a distance, and therefore solving the Ax+By+Cz=D equation can yield a distance that is then compared to some predetermined distance threshold. Since, in trailer-loading facilities, the surface of the loading facility lot is below the interior floor of a docked trailer, evaluating the distance from a point (such as the image capture apparatus) to the floor plane can provide an indication of whether that distance extends to the interior floor of a trailer or to the surface of the loading facility lot. Therefore, if in step 212 the distance to the detected plane is within a threshold (the threshold being a maximum expected distance (in some cases only vertical) from a point like the image capture apparatus to the interior floor of a docked trailer along a direction (e.g., 11.5 ft, 9.2 ft, etc.)), that provides an indication that a trailer with an open door is present at the loading bay. On the other hand, if in step 212 the distance to the floor plane is outside the threshold, or the floor plane cannot be found/calculated (indicative of, for example, irreflective black pavement), that provides an indication that any trailer that may have been docked at the loading bay earlier is absent.

Having the indication that a trailer is no longer at a loading bay can be acted upon by a system server to associate the absence of a trailer that was previously docked at the loading bay with a door closure of that trailer, especially if, subsequent to a presence of an open door, the presence of a closed door was not detected.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations. Moreover, no steps of any method disclosed herein shall be understood to have any specific order unless it is expressly stated that no other order is possible or required by the remaining steps of the respective method.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A method for detecting a trailer door status, the method comprising:
   mounting an image capture apparatus proximate a trailer-loading area, the image capture apparatus operable to capture three-dimensional images;
   capturing, via the image capture apparatus, a three-dimensional image representative of a three-dimensional formation, the three-dimensional image having a plurality of points with three-dimensional point data;
   analyzing respective depth values of a first sub-plurality of the plurality of points to determine whether the three-dimensional formation is within a first predetermined distance threshold from a location; and
   when the three-dimensional formation is within the first predetermined distance threshold, analyzing respective depth values of a second sub-plurality of the plurality of points to determine whether the three-dimensional formation is substantially flat, a determination of the three-dimensional formation being substantially flat being indicative of the trailer door being closed.

2. The method of claim 1, wherein the location is at least one of an image capture apparatus location and a trailer-loading area location.

3. The method of claim 1, wherein substantially flat includes being substantially level along a given plane and being substantially continuous.

4. The method of claim 1, wherein the operation of analyzing the respective depth values of the first sub-plurality of the plurality of points incudes determining an average value of the respective depth values of the first sub-plurality of the plurality of points.

5. The method of claim 1, wherein the operation of analyzing the respective depth values of the second sub-plurality of the plurality of points includes determining whether a variance of the respective depth values of the second sub-plurality of the plurality of points is within a predetermined depth-variance threshold, the variance being within the predetermined depth-variance threshold being indicative that the three-dimensional formation is substantially flat.

6. The method of claim 1, wherein the plurality of points with three-dimensional point data includes a point cloud.

7. The method of claim 1, wherein the determination of the three-dimensional formation being not substantially flat is indicative of the trailer door being open.

8. The method of claim 1, wherein the first predetermined distance threshold is less than 3 feet away from the image capture apparatus.

9. The method of claim 1, wherein, when the three-dimensional formation is outside the first predetermined distance threshold, the method further comprises analyzing the three-dimensional image to detect a presence or an absence of a trailer.

10. The method of claim 9, wherein the operation of analyzing the three-dimensional image to determine the presence or the absence of the trailer includes:
   detecting a presence or an absence of an upright wall, the presence of the upright wall being indicative of the trailer being present; and
   when the absence of the upright wall is detected and the three-dimensional image includes a third sub-plurality of the plurality of points representative of an object positioned some distance away from the image capture apparatus, analyzing the three-dimensional image to determine the some distance, the some distance being within a second predetermined distance threshold being indicative of the trailer being present and the some distance being outside the second predetermined distance threshold being indicative of the trailer being absent.

11. The method of claim 10, wherein the trailer being absent is indicative of the trailer door being closed.

12. The method of claim 10, wherein the second predetermined distance threshold is 9.2 feet.

13. The method of claim 10, wherein the operation of analyzing the three-dimensional image to determine the some distance includes conducting sample consensus (SAC) segmentation analysis.

14. A trailer monitoring unit (TMU) for reporting a status of a trailer door, comprising:
   a housing;
   an imaging assembly at least partially within the housing and operable to capture a three-dimensional image representative of a three-dimensional formation, the three-dimensional image having a plurality of points with three-dimensional point data; and
   a controller communicatively connected to the imaging assembly, the controller operable to:
      analyze respective depth values of a first sub-plurality of the plurality of points to determine whether the three-dimensional formation is within a first predetermined distance threshold from a location;
      when the three-dimensional formation is within the first predetermined distance threshold, analyze respective depth values of a second sub-plurality of the plurality of points to determine whether the three-dimensional formation is substantially flat; and
      provide a determination of the trailer door being closed when the three-dimensional formation is substantially flat.

15. The TMU of claim 14, wherein the location is a TMU location.

16. The TMU of claim 15, wherein the first predetermined distance threshold is less than 3 feet.

17. The TMU of claim 14, wherein the controller operable to analyze the respective depth values of the first sub-plurality of the plurality of points to determine whether the three-dimensional formation is within the first predetermined distance threshold by determining an average value of the respective depth values of the first sub-plurality of the plurality of points.

18. The TMU of claim 14, wherein the controller operable to:
   analyze the respective depth values of the second sub-plurality of the plurality of points to determine whether the three-dimensional formation is substantially flat by determining whether a variance of the respective depth values of the second sub-plurality of the plurality of points is within a predetermined depth-variance threshold;

determine that the three-dimensional formation is substantially flat when the variance is within the predetermined depth-variance threshold; and determine that the three-dimensional formation is not substantially flat when the variance is outside the predetermined depth-variance threshold.

19. The TMU of claim 14, wherein the controller is further operable to provide a determination of the trailer door being open when the three-dimensional formation is not substantially flat.

20. The TMU of claim 14, wherein the controller is further operable to analyze the three-dimensional image to detect a presence or an absence of a trailer when the three-dimensional formation is outside the first predetermined distance threshold.

21. The TMU of claim 20, wherein, to analyze the three-dimensional image to detect the presence or the absence of the trailer, the controller is operable to:

detect a presence or an absence of an upright wall, the presence of the upright wall being indicative of the trailer being present, and when the absence of the upright wall is detected and the three-dimensional image includes a third sub-plurality of the plurality of points representative of an object positioned some distance away from the TMU, analyze the three-dimensional image to determine the some distance, the some distance being within a second predetermined distance threshold being indicative of the trailer being present and the some distance being outside the second predetermined distance threshold being indicative of the trailer being absent.

22. The TMU of claim 21, wherein the second predetermined distance threshold is 9.2 feet.

23. The TMU of claim 21, wherein the controller is further operable to provide a determination of the trailer door being open when the presence of the trailer is detected.

24. A system for reporting a status of a trailer door at a loading dock, comprising:

a host computer; and a trailer monitoring unit (TMU) mounted proximate a loading bay and communicatively connected with the host computer, the TMU including:

a housing;

an imaging assembly at least partially within the housing and operable to capture a three-dimensional image representative of a three-dimensional formation, the three-dimensional image having a plurality of points with three-dimensional point data; and a controller communicatively connected to the imaging assembly and the host computer, the controller operable to:

analyze respective depth values of a first sub-plurality of the plurality of points to determine whether the three-dimensional formation is within a first predetermined distance threshold from a location;

when the three-dimensional formation is within the first predetermined distance threshold, analyze respective depth values of a second sub-plurality of the plurality of points to determine whether the three-dimensional formation is substantially flat; and provide a first communication to the host computer representative of the trailer door being closed when the three-dimensional formation is substantially flat.

25. The system of claim 24, wherein the controller is further operable to analyze the three-dimensional image to detect a presence or an absence of a trailer when the three-dimensional formation is outside the first predetermined distance threshold.

26. The system of claim 25, wherein, to analyze the three-dimensional image to detect the presence or the absence of the trailer, the controller is operable to:

detect a presence or an absence of an upright wall, the presence of the upright wall being indicative of the trailer being present; and when the absence of the upright wall is detected and the three-dimensional image includes a third sub-plurality of the plurality of points representative of an object positioned some distance away from the TMU, analyze the three-dimensional image to determine the some distance, the some distance being within a second predetermined distance threshold being indicative of the trailer being present and the some distance being outside the second predetermined distance threshold being indicative of the trailer being absent, wherein the controller is further operable to:

provide a second communication to the host computer representative of the trailer being present; and provide a third communication to the host computer representative of the trailer being absent, and wherein the host computer is configured to:

associate the second communication with the trailer door being open; and associate the third communication with a door of a departed trailer being closed.

* * * * *